United States Patent
Müller

(10) Patent No.: US 9,050,943 B2
(45) Date of Patent: Jun. 9, 2015

(54) HANDLE UNIT

(75) Inventor: Ulrich Müller, Velbert (DE)

(73) Assignee: HUF HULSBECK & FURST GMBH & CO. KG (DE)

( * ) Notice: Subject to any disclaimer, the term of this patent is extended or adjusted under 35 U.S.C. 154(b) by 1065 days.

(21) Appl. No.: 12/674,383

(22) PCT Filed: Aug. 8, 2008

(86) PCT No.: PCT/EP2008/060458
§ 371 (c)(1),
(2), (4) Date: Aug. 16, 2011

(87) PCT Pub. No.: WO2009/027206
PCT Pub. Date: Mar. 5, 2009

(65) Prior Publication Data
US 2011/0309912 A1   Dec. 22, 2011

(30) Foreign Application Priority Data

Aug. 24, 2007  (DE) .................. 10 2007 040 294

(51) Int. Cl.
*B60R 25/00* (2013.01)
*B60R 25/24* (2013.01)
*G07C 9/00* (2006.01)

(52) U.S. Cl.
CPC .......... *B60R 25/246* (2013.01); *G07C 9/00309* (2013.01); *G07C 2209/64* (2013.01)

(58) Field of Classification Search
None
See application file for complete search history.

(56) References Cited

U.S. PATENT DOCUMENTS

| | | | |
|---|---|---|---|
| 5,682,135 A | | 10/1997 | Labonde |
| 5,844,470 A | * | 12/1998 | Garnault et al. ............. 340/5.62 |
| 6,239,693 B1 | * | 5/2001 | Benard et al. ............ 340/426.26 |
| 6,907,323 B2 | | 6/2005 | Avenel |
| 7,283,034 B2 | * | 10/2007 | Nakamura et al. ........... 340/5.72 |
| 2001/0011836 A1 | * | 8/2001 | Grey ............................. 296/214 |
| 2001/0028297 A1 | * | 10/2001 | Hara et al. ................... 340/5.62 |

(Continued)

FOREIGN PATENT DOCUMENTS

| | | |
|---|---|---|
| DE | 195 16 316 A1 | 11/1996 |
| DE | 19813782 | 5/1999 |

(Continued)

OTHER PUBLICATIONS

CN OA dated Jan. 22, 2013_Chinese Patent Application No. 200880104230.5, with English Summary.

(Continued)

*Primary Examiner* — Curtis King
(74) *Attorney, Agent, or Firm* — Cantor Colburn LLP

(57) ABSTRACT

The invention relates to a handle unit (10) to trigger the function of a lock (19) for opening and/or for closing a moving part (42), in particular a door, a tailgate or similar of a motor vehicle (40), with one electronic unit (20, 20') and one actuating element, wherein the electronic unit (20, 20') is used for data communication with a vehicle part, in particular with a security system; the actuating element monitors an actuation zone (60) and a signal is triggered by means of the actuating element by a movement of an object (100) within the actuation zone (60). The invention provides that the actuating element optically monitors the actuation zone (60) so that the detection of a specified motion pattern (30) due to movement of the object (100) will cause a triggering of the signal.

37 Claims, 5 Drawing Sheets

(56) References Cited

U.S. PATENT DOCUMENTS

| | | | |
|---|---|---|---|
| 2001/0052839 A1* | 12/2001 | Nahata et al. | 340/5.72 |
| 2003/0105559 A1 | 6/2003 | Avenel | |
| 2004/0177478 A1* | 9/2004 | Louvel | 16/430 |
| 2006/0087429 A1* | 4/2006 | Snell et al. | 340/545.1 |
| 2007/0071448 A1* | 3/2007 | Zhang | 398/159 |
| 2007/0147731 A1* | 6/2007 | Barrowclough | 385/18 |
| 2008/0224836 A1* | 9/2008 | Pickering | 340/426.14 |
| 2009/0005011 A1* | 1/2009 | Christie et al. | 455/412.2 |

FOREIGN PATENT DOCUMENTS

| | | |
|---|---|---|
| DE | 198 43 594 A1 | 4/2000 |
| DE | 101 21 046 A1 | 11/2002 |
| DE | 10132077 | 1/2003 |
| DE | 102 40 850 A1 | 3/2004 |
| DE | 10330525 | 6/2005 |
| DE | 10 2004 021 505 | 9/2005 |
| DE | 10 2005 031 441 | 1/2007 |
| DE | 601 25 538 T2 | 10/2007 |
| EP | 09 72 897 A1 | 1/2000 |
| EP | 16 09 674 A1 | 12/2005 |
| FR | 2808339 | 11/2001 |
| GB | 2336625 A | 10/1999 |
| WO | 2007038162 A1 | 4/2007 |

OTHER PUBLICATIONS

German Search Report, 10 2007 040 294.7, dated Jan. 15, 2009.
CN OA 200880104230.5 dated Aug. 23, 2011.
International Search Report; PCT/EP2008/060458; Dec. 3, 2008.

* cited by examiner

HANDLE UNIT

FIELD OF THE INVENTION

Disclosed is a handle device for function release of a lock for opening and/or closing of a moving part, especially a vehicle door, trunk lid or the like, with an electronic unit and an operating device, the electronic unit serving for data communication with a part on the vehicle side, especially a security system, the operating device monitoring an operating zone, tripping of a signal occurring by means of the operating device by movement of an object within the operating zone.

This type of handle device is may be used as an outside door handle in a vehicle. Handle devices can have a fixed handle element fastened to the moving part.

BACKGROUND

In this case, the fixed handle element can be pulled or pushed, in order to open or close the moving part. Some handle devices also have a moving handle element, which can be moved on the fixed handle element, especially rotated and/or pivoted, and serves for actual operating of the lock. Operation of the lock can then function purely electronically, or also mechanically.

A handle device is known from Unexamined Patent Application DE 101 32 077 A1, in which a signal is tripped by a capacitive sensor. If a user approaches the handle device, this leads to an effect on the electric field built up by the capacitor sensor. It has proven a drawback in this type of handle device that the electromagnetic field and therefore the sensor of the handle device can be strongly influenced by environmental effects. In addition, only a single signal can be tripped with the described handle device. Only a combination of several sensors permits tripping of the second or third signal. However, this leads to additional cost of the described handle device.

SUMMARY OF THE INVENTION

The underlying task of the disclosure is therefore to obtain a handle device for initiating function of a lock for opening and/or closing of a moving part, which has high operating comfort and has a simple and space-saving design.

To solve this task, a handle device with the features of Claim 1 is proposed. Moreover, the task is solved by a method for contactless tripping of a signal on a handle device in advantageous fashion. Other handle device variants are apparent from the dependent claims. Features and details that are described in conjunction with the method according to the invention naturally also apply in conjunction with the handle device and vice-versa. The features mentioned in the claims and in the description can then be significant individually or in any combination.

It is proposed according to the invention that the operating device monitors the operating zone optically, so that recording of a stipulated movement pattern by movement of the object leads to tripping of the signal.

Importantly, a function of a lock can be initiated by the handle device. This function can consist of opening or closing of a moving part, for example, a door or lid, as well as locking or unlocking of a lock. To initiate this function, it is proposed that an operating zone be monitored optically. Optical monitoring has the advantage that environmental effects do not lead to a compromise of sensitivity or size of the operating zone. In context, it is required that an object must execute a movement within the operating zone that must agree with a stipulated movement pattern, in order to initiate the mentioned functions. Arbitrary movement within the operating zone is therefore not required, but a movement that corresponds to a predefined movement pattern. Because of this, it is ensured, in the first place, that random movements within the operating zone do not lead to initiation of the function. On the other hand, a number of movement patterns can be predefined, each of which initiate different functions. Thus, movement in a first direction can lead to unlocking of a lock or opening of a door. An opposite movement in a second direction, on the other hand, can entail locking of the lock or closing of the door. Owing to the fact that the movement within the operating zone is optically scanned and compared with a movement pattern, it is no longer necessary to touch the handle device. This is particularly advantageous when the handle device is soiled and a potential user does not want to touch it. The handle device is combined during use in a vehicle with a keyless entry system. Such keyless entry systems permit keyless access to vehicles, for which purpose a dialog occurs between a mobile identification transmitter and a security system of the vehicle. Depending on the configuration, the signal tripped by the handle device can start a dialog between the two elements of the keyless entry system and initiate the function of the lock and/or door, under the stipulation of positive identification.

Another advantageous variant is characterized by the fact that the stipulated movement pattern is at least two-dimensional movement of the object in the operating zone.

An expedient for improvement proposes that keyless activation of a locking and unlocking process of a lock can be initiated by means of the operating device, especially that keyless activation can be initiated contactless within the operating zone.

Another advantageous variant is characterized by the fact that the signal initiates opening and/or closing of the moving part, especially that the signal initiates opening and/or closing of a vehicle door, a trunk lid or the like.

An expedient for improvement proposes that, depending on the stipulated movement pattern, the operating device serves as a push-button, a slider, a proximity detector, a motion detector and/or a detector that records three-dimensional movements.

Another advantageous variant is characterized by the fact that the operating zone is an optically monitored three-dimensional zone, especially that the operating device has a sensor, with particular preference that the sensor is configured opto-electronically, especially that the sensor has at least one light transmitter and at least one light receiver, in which case the movement pattern of the object in the operating zone can be determined by means of the sensor.

An expedient for improvement proposes that the object be a human hand, a human finger or a mechanical component.

It is proposed that the handle device has an electronic unit. This electronic unit can be an electronic component of a keyless entry system. It then plays no role whether a so-called active or passive keyless entry system is involved. Normally, in both keyless entry systems it is possible to open or close the moving part or door or lid in keyless fashion.

In an expedient embodiment of the handle device, all electronic units arranged in the handle device can be provided exclusively in the moving handle element. Electrical lines, cables or the like can be passed from the moving handle element through the fixed handle element in this variant, in order to connect the electronic units electrically to the other vehicle electronics.

It is optionally possible that the electronic units in the moving handle element can be supplied with power via a transponder, in which the transponder is arranged in the moving part, especially in the vicinity of the handle device. At the same time, the transponder can also serve for data exchange with the electronic elements in the moving handle device. Consequently, not only wireless power transmission, but also wireless data transmission is possible. Data exchange can then occur through corresponding modulation during power transmission. A simple wireless power transmission can occur, for example, by induction with a coil system. For this purpose, a primary coil is arranged in the transponder and the electronic elements in the moving handle element have a secondary coil, in which the required power is induced.

In order for access to a vehicle to also be possible in an emergency, if the security system (keyless entry system) does not unlock the lock, a mechanical lock cylinder can additionally be arranged in the handle device. It is then expedient that the mechanical lock cylinder be arranged in the fixed handle element and permit mechanical unlocking or unsecuring of the lock.

In order to produce an aerodynamic and ergonomic embodiment of the handle device, it can be prescribed that the handle device form a trough with the moving part, into which a user can engage. Because of this, at least three areas are formed in the handle device, namely, a first area, in which the lock cylinder is arranged, a middle area, in which the handle trough is provided, and a third area, which is arranged after the handle trough on the side facing away from the lock cylinder. In this embodiment, the fixed handle element can be fastened in the first and third area or to the left and right of the handle trough on the moving part. Mechanical fastening elements, especially screws, which can be turned into the fixed handle element, can be used here. Other mechanical fastening elements can naturally also be used to secure the fixed handle element, like rivets, snap connections, welded joints or the like. It is also recommended to arrange the handle device recessed in the moving part, in which case a corresponding ledge is provided for this purpose in the moving part. The handle device only slightly protrudes from the surface of the moving part on this account and is therefore configured particularly aerodynamically. Through the additional recess provided in the ledge of the moving part, the handle trough for the handle device is formed in the moving part. Ergonomic handling of the handle device is also attainable on this account.

Another advantageous variant is characterized by the fact that the operating device is arranged in a housing.

Another expedient for improvement proposes that a cover element cover the operating device and, with particular preference, that the cover element be bonded to the housing. Bonding of the cover element to the housing can be ensured by known clip methods or welding methods. The cover element can also be configured as laser-transparent and the housing as laser-absorbing, in order to permit laser welding of the cover element to the housing. By bonding of the cover element to the housing, it is ensured that no environmental effects can penetrate into the interior of the handle device.

Another advantageous variant is characterized by the fact that the cover element is transparent, especially that the cover element is transparent for the wavelength emitted by the light transmitter and, with particular preference, that the operating zone is arranged above an outside of the cover element facing the object. In this variant, the cover element is made light-transparent, in order to form an operating zone on an outer surface of the handle device. A user can consequently swipe over the handle device or almost touch it, in order to trip the signal. For this purpose, the operating device is arranged in the interior of the housing and the cover element is configured transparent. The light transmitters can thus emit light unhampered, which passes through the cover element. Light reflected by the object can also pass through the cover element without attenuation and be recorded by light receivers. Because of this, it is possible for the operating device to record the movement of the object (for example, a hand) within the operating zone on the outside of the housing of the handle device.

An expedient for improvement proposes that the cover element be opaque and the operating device monitors a bottom of the cover element facing away from the object. In this variant, the operating device does not monitor an area in the outside surface of the handle device. Instead, an inner area of the handle device is optically scanned. The monitored object is then the cover element, which functions as transmission device for contact of the mobile identification transmitter. If a user wishes to trip a signal, he touches the handle device in the area of the cover element. This contact leads to plastic deformation of the cover element. This deformation means that the cover element executes a movement within the operating zone of the operating device. This movement then leads to tripping of the signal. In an advantageous embodiment of this variant, the outside of the cover element has a surface structure. Because of this, a tactile feel is produced for a potential user during tripping of the signal. The cover element can also have different segments, in which different signals are tripped. If one of these segments is deformed, the operating device records the location of the deformation and can determine from this the signal to be tripped.

Another expedient for improvement proposes that the operating zone be arranged above an outer surface of the housing facing the object, especially for the operating zone to have a drop-like shape.

Another advantageous variant is characterized by the fact that the light transmitter is a light diode (LED), an organic light diode (OLED) or a laser diode, especially that the light transmitter emits infrared light. A light-emitting diode (LED) is a semiconductor component that emits incoherent light with a narrow spectrum. The wavelength of the emitted light depends on the semiconductor components and possible doping. The also usable organic light-emitting diode (OLED) is a special type of LED, in which the light-emitting layer is formed from organic components.

An improving measure also proposes that the transmitter contain at least one optoelectronic measurement device with at least five light transmitters and at least one light receiver.

Another advantageous variant is characterized by the fact that the sensor contains at least one optoelectronic measurement device with at least two light transmitters and at least one light receiver, in which recording lobes define a far zone and near zone lying within the operating zone, recording lobes being assigned to the light transmitters, and that the operating device also has an evaluation unit, in which the evaluation unit trips the signal starting from a movement of the object from a position in the far zone in a predetermined direction into the near zone.

Another expedient for improvement proposes that the sensor be a HALIOS® component.

Another advantageous variant is characterized by the fact that the operating device has at least one transmitting element for radiation in the wavelength range of the light and at least one receiving element to receive at least one part of the radiation emitted by the transmitting element and radiated back by the object, and with a light guide arranged in the beam path between the transmitting element and the receiving element, in which the light guide itself has light coupling devices for coupling of the radiation diffusely scattered on the object, passed beforehand through the light guide.

An improving expedient also proposes that the light coupling device couple the light in the light guide scattered by the object across the longitudinal extent of the light guide.

Another variant is characterized by the fact that the operating device has an arrangement for measurement or recognition of a change on or as a result of a back-radiating element, in which the arrangement for measurement or recognition of a change on or as a result of a back-radiating element is separated from the arrangement by a medium transparent for a certain radiation with
- a sensor-active area in the medium with at least two measurement zones with corresponding radiation sources for introduction of the specified radiation into the radiation-transparent medium and with at least one radiation receiver, in which the radiation receiver is arranged in the overlapping area of the zones of maximum radiation intensity in the sensor-active region situated in a state of rest and the back-radiation of the radiation sources assigned to the radiation receiver emerging on the side of the medium opposite the back-radiating element to generate a detection signal corresponding to the received radiation,
- a switch arrangement for active switching in time segments of each of the individual measurement zones in a consecutive, repeating switching sequence with a specified switching sequence frequency,
- an adjustment device to adjust a radiation source assigned to the radiation power of the corresponding measurement zone, so that in the sensor-active region in a state of rest each measurement zone produces a section of the detection signal, whose average amplitude value is equal to the average amplitude value of the section of the detector signal assigned to at least one other measurement zone,
- a filter circuit connected after the radiation receiver to transmit the detection signal modulated on an oscillation of the switching sequence frequency to an evaluation arrangement to generate a control and/or a measured value signal from the difference measured or established in the evaluation arrangement of sections of the detection signal assigned to individual measurement zones.

Another expedient for improvement proposes that at least two measurement zones be formed by at least one light transmitter and several light receivers.

The task is also solved according to the invention by a method for contactless tripping of a signal on a handle device, in which the handle device serves for function initiation of a lock for opening and/or closing of a moving part, especially a vehicle door, trunk lid or the like, the handle device having an electronic unit and an operating unit, the electronic unit serving for data communication with a part on the vehicle side, especially a security system, an operating zone being monitored by means of the operating device and a signal being tripped by means of the operating device by movement of an object within the operating zone, and that the operating zone is monitored by the operating device optically and the signal is tripped by recording of a stipulated movement pattern by movement of the object.

An expedient that improves the method proposes that the movement pattern include at least two-dimensional movement of the object in the operating zone, especially that the movement pattern include at least three-dimensional movement of the object in the operating zone.

The movement pattern can be any movement within the operating zone. Thus, swiping, touching or also rotating movement of the object, for example, a hand, is detectable. It is only critical that the movement pattern be predefined. Only when movement of the object coincides with the predefined movement pattern is the signal tripped.

Another improving expedient proposes that a second movement pattern initiate a second signal, the movement pattern and the second movement pattern being different.

Different types of signals can therefore be tripped by different movement patterns. If the handle device is used in a vehicle, a locking signal, for example, can be tripped by swiping through the operating zone. The optical operating device recognizes the linear movement of the object, as well as its direction and speed. From the determined values, it can be determined in a computer unit whether the measured movement agrees with the movement pattern. If this is the case, the locking signal is tripped. In contrast to this, a touching movement on the handle device can lead to tripping of the second signal. Again the operating device optically measures the movement of the object within the operating zone. If this agrees with the second movement pattern, the second signal (and unlocking signal) is tripped.

Another advantageous variant is characterized by the fact that the object in the movement pattern is moved in a first direction through the operating zone and, in the second movement pattern, the object is moved in a second direction through the operating zone, especially the first direction and the second direction being opposite.

Another expedient for improvement proposes that through execution of the movement pattern, keyless activation of a locking and unlocking process of a lock be initiated, especially that keyless activation be initiated in contactless fashion within the operating zone.

Another advantageous variant is characterized by the fact that for activation of the locking process, the object is moved according to the movement pattern in the first direction through the operating zone.

Another improving expedient proposes that, for activation of the unlocking process, the object be moved through the operating zone according to the second movement pattern in the second direction.

Another advantageous variant is characterized by the fact that, for activation of the unlocking process, a linear movement pattern is executed, especially that a user swipes over the operating zone to activate the unlocking process.

An expedient for improvement proposes that the movement pattern of a locking or unlocking process of a lock be displayed on a display.

Another advantageous variant is characterized by the fact that proof of authorization for contactless tripping of a signal is carried out in the handle device, especially that a mobile identification transmitter conducts a dialog with the electronic unit during execution of the movement pattern in the operating zone, with particular preference that authorization is checked in the context of the dialog.

Another improving expedient proposes that, with a positive result of authorization check, the signal be tripped.

Another advantageous variant is characterized by the fact that the operating device has a sensor and the sensor has at least two first light sources that emit sequentially timed light and at least one receiver to receive at least the synchronously timed alternating light fraction originating from the first light sources.

An expedient for improvement proposes that the sensor control a light intensity emitted by at least one light source, so that a time-synchronous alternating light fraction that occurs between different phases becomes zero on the receiver and to control the emitted light intensity, a receiving signal on the receiver is determined with reference to phase position and a control quantity is therefore generated.

Another advantageous variant is characterized by recognition of a movement pattern with the handle device according to one of the preceding claims with the steps:

Emission of radiation in the wavelength range of the light,

Passage of the light through a light guide to the object,

Back-radiation of at least part of the light from the object and back-coupling of the back-radiated light into the light guide, Receiving of the back-radiated light with formation of an input signal, Evaluation of the input signal to determine the movement and/or position of the object, The diffusely back-scattered light is coupled into the light guide via the light-coupling device of the light guide itself.

An improving expedient also proposes that the light-coupling device couple the light back-scattered by the object across the longitudinal extent of the light guide into the light guide.

Another advantageous variant is characterized by the fact that the radiation emitted by the transmitting element through the light guide is emitted across the light guide, starting from the side opposite the object, before it is back-scattered by the object.

An expedient for improvement proposes that the radiation emitted by the transmitting element along the light guide be decoupled at least partially by the light-coupling devices from the light guide before it is scattered by the object.

The disclosure is also directed toward a vehicle, especially a vehicle with a handle device according to one of the Claims 1 to 21.

BRIEF DESCRIPTION OF THE FIGURES

Additional advantages, features and details of the disclosure are apparent from the dependent claims and the following description, in which several practical examples of the disclosure are described in detail with reference to the drawings. Features mentioned in the claims and description can be essential for the disclosure both individually or in any combination. In the drawings:

DETAILED DESCRIPTION

Figure 1:
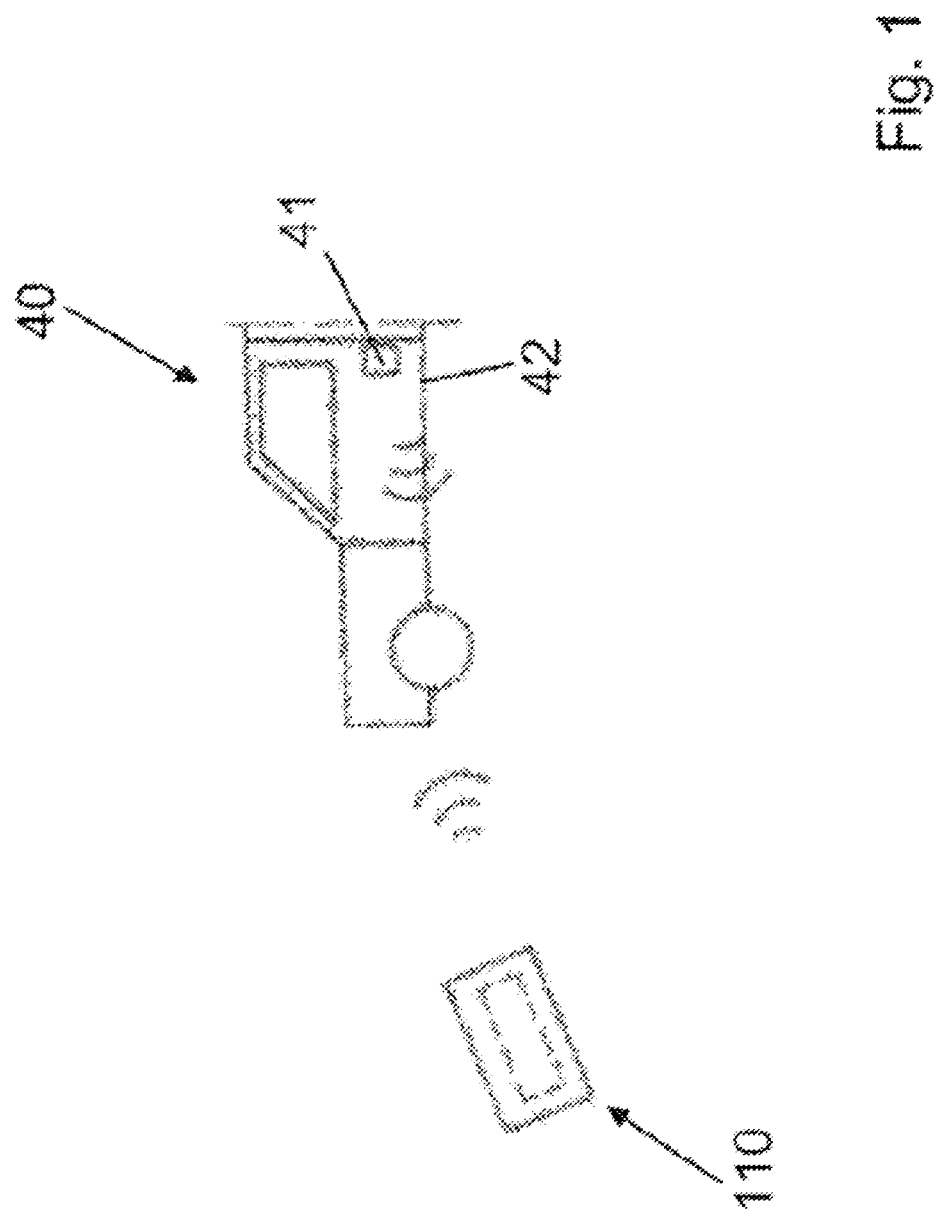
FIG. 1 shows a schematic view of a mobile identification transmitter in data communication with a lock of a vehicle.

A mobile identification transmitter 110 is depicted purely schematically in FIG. 1, which is in communication with a transmitting and receiving unit 41 of a vehicle 40. The mobile identification transmitter 110 has, among other things, an electronic unit supplied with a battery as energy accumulator.

Figure 2:
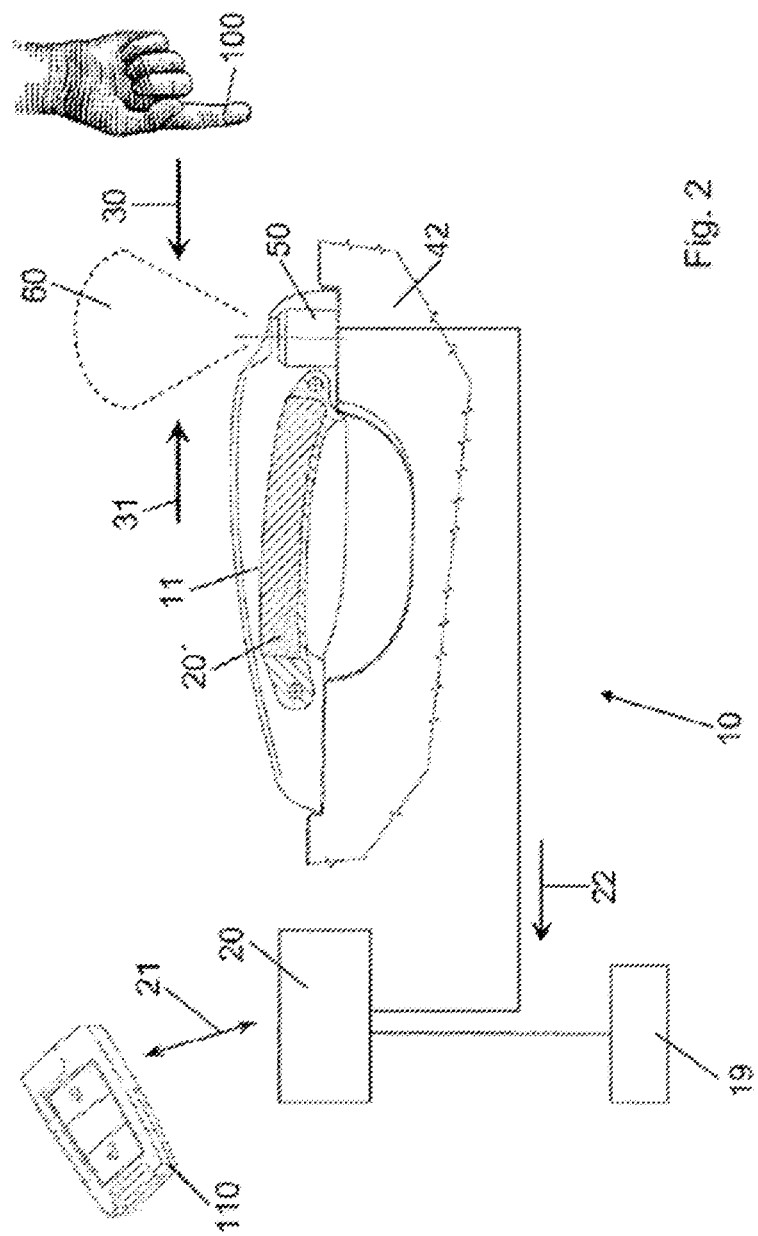
FIG. 2 shows a schematic view of a handle device.

A handle device 10 is depicted in FIG. 2. The handle device 10 is arranged in a moving part 42—here a door of a vehicle. Part of the handle device 10 is the handle element 11, which can be pulled or pushed, in order to open or close the moving part 42. An operating device 50 is arranged within handle element 11. This operating device 50 optically monitors an operating zone 60, which has a lobe-like three-dimensional shape. Electrical and/or mechanical function initiation of a lock 19 for opening or closing of the moving part 42 can occur on the handle device 10. For this purpose, it is prescribed that an object 100, like the hand of a user, be passed through the operating zone. A signal 22 is tripped by means of the operating device 50 on this account. A requirement for this is that the movement of the object 100 corresponds to a stipulated movement pattern 30. For example, the user can guide his hand over the handle device 10 in a direction stipulated by the movement arrow 30 and, in so doing, initiate unlocking of the lock. A requirement is that the operating device 50 recognizes that the movement executed by the object 100 corresponds to the predefined movement pattern. The operating device 50 then indirectly and/or directly generates signal 22. This signal 22 is received by the electronic unit 20. Depending on an identification sequence still to be further described, the electronic unit 20 sends an unlocking or locking signal to lock 19. Depending on the configuration of the handle device 10, the electronic unit 20 can be arranged, for example, in another area of the vehicle 40. However, it is also conceivable that the electronic unit 20' is incorporated within the handle shell element 11 of the handle device. The latter variant has the advantage that the communication path between the operating device 50 and the electronic unit 20' is very small.

For optical monitoring of the operating zone 60, the operating device 50 can have at least one sensor. This sensor includes at least two light sources and at least one receiver. From combination of the mentioned elements, a sensor can be created that can optically monitor the operating zone 60 and detect movement patterns of object 100. For this purpose, a computer unit can be arranged in the operating device 50, which evaluates measurement results of the receiver and calculates from the evaluated amplitudes and/or phases of the received light the movement pattern 30. As described, using the following figures, there are different arrangements of light sources and receivers, in order to optically span the desired operating zone 60 and determine movements 30 of object 100.

The operating device 50 need not be restricted to recognizing only a single movement pattern 30. For example, it is shown in FIG. 2 that a second movement pattern 31 is also recognized by the operating device 50. The second movement pattern 31 is also an optionally two- or three-dimensional movement of object 100 within the operating zone 60. Depending on whether the first movement pattern 30 or the second movement pattern 31 is executed, the operating device 50 generates a signal or a second signal. Within the electronic unit 20, 20', the signal 22 and the second signal 22' can initiate different functions. For example, the signal 22 can lead to activation of the locking process of the moving part 42. In contrast to this, the generation of the second signal produces an unlocking process of lock 19, which is arranged on the moving part 42. This coordination of different movement patterns 30, 31 to different actions has the advantage that a potential user can initiate functions of the lock 19 by distinct movement patterns 30, 31 on the handle device 10. In particular, it is possible for him, after first tripping of signal 22 by the movement pattern 30, to do this again to gain personal security, if an uncertainty occurred, whether the desired operation was conducted. This has proven to be particularly advantageous in modern passive keyless entry systems.

In another variant, the handle device 10 can detect a third movement pattern. This third movement pattern, for example, can consist of approach of a person to a vehicle 40. A third signal tripped by optical detection of the third movement pattern causes the electronic unit 20 and/or a security system of vehicle 40 to communicate with a mobile identification transmitter 110. In the context of the following description, it will be assumed that communication between the electronic unit 20 and the mobile identification transmitter 110 is carried out. However, it is just as possible to carry out dialog 21 between the mobile identification transmitter 110 and a security system of the vehicle. Both variants are equivalent. In the context of dialog 21, the electronic unit 20 first sends an alarm signal to the mobile identification transmitter 110. This alarm signal causes the mobile identification transmitter 110 to send a code key to the electronic unit 20. This code key is evaluated by the electronic unit 20, which generally requires comparison with the data stored in the electronic unit 20. If it is found, in the context of evaluation, that the mobile identification transmitter 110 is authorized to lock or unlock the vehicle, a corresponding function initiation of lock 19 can be initiated in the electronic unit 20. A requirement for actual unlocking or locking of the lock 19 is also receiving of signal 22 by the electronic unit 20. Depending on the variant, the signal 22 can be generated before or after communication 21 with the mobile identification transmitter 110. Only the combination of detection of the stipulated movement pattern and the positive authorization query of the mobile identification transmitter 110 leads to actual initiation of the locking or unlocking process of lock 19.

In another variant, the operating device can also be equipped as a detector that records three-dimensional movements. In this variant, a swiping movement over the mobile identification transmitter 10 in the area of operating zone 60 could lead to an unlocking process of a lock integrated in the vehicle.

In a variant not shown, the operating device 50 is arranged within the handle shell element 11 under a cover element. Light is emitted directly or indirectly from the operating device 50, which spans the operating zone 60. To make this possible, the cover element must be designed transparent. In addition, the cover element protects the operating device 50 from environmental effects, like, moisture or dirt. In an advantageous variant, the cover element is bonded in the handle shell element 11.

Figure 3:
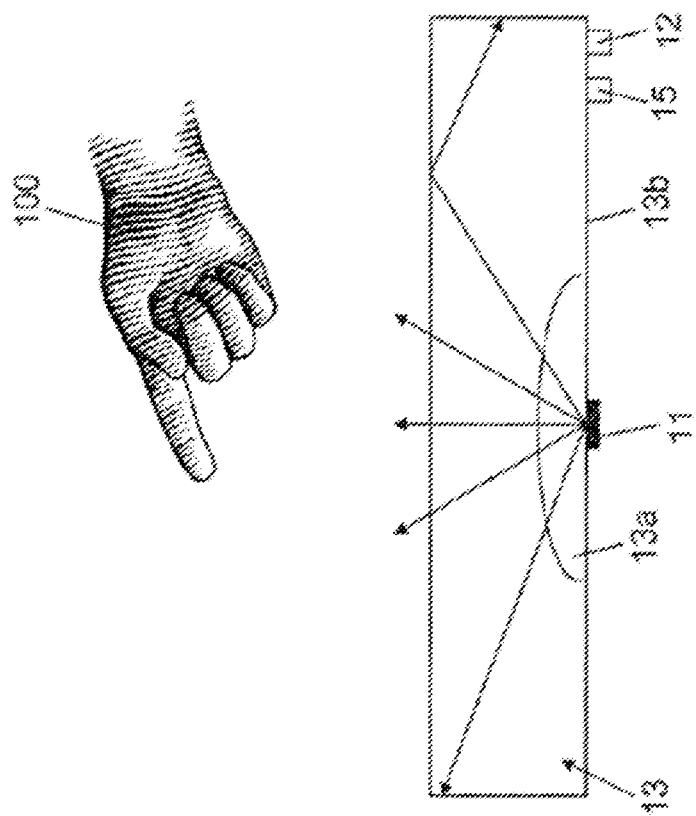
FIG. 3 shows a side view of a light guide with light-coupling devices in the vicinity of an object.

FIG. 3 shows a sensor integrated in the operating device for optoelectronic recognition of movement and/or position of an object 100. For example, approach of a finger to the mobile identification transmitter 10 can be recognized. The device has at least one transmitting element 11 to send radiation in the wavelength range of light from infrared to ultraviolet and at least one receiving element 12 to receive at least part of the radiation emitted by the transmitting element 11 and scattered on object 100. A light guide 13 is also arranged in the beam path between the transmitting element 11 and the receiving element 12. This light guide 13 has light-coupling devices to couple radiation diffusely scattered on object 100 and passed beforehand through light guide 13, which was subjected to an angle change on the object. The radiation is coupled by the light-coupling device 13a according to FIG. 3 in that the light-coupling device is shaped in the light guide, so that beams falling across the light guide are totally reflected from a certain angle and then further guided in the light guide. Light impinging across the light guide is therefore almost redirected at a right angle, depending on the optical properties of the light guide.

The transmitting element 11 can send light transversely through the light guide as in FIG. 3, so that the radiation initially does not enter the light guide, since it does not undergo the total reflection required for this. If the light, however, is back-scattered by object 100, the back-scattered light is totally reflected in the light guide on the light-coupling devices 13a and then "trapped" in the light guide. In other words, the reflection properties of light guide 13 and the arrangement of the transmitting element relative to the light guide are such that the transmitting element 11 can pass light essentially through the light guide. However, if the light is also diffusely back-scattered only with a slight angle change by object 100, total reflection of the "trapped" light beam is possible in the practical example, so that the light can then be further conveyed in the light guide. The transmitting element is then usually situated on the side 13b of the light guide that faces away from the moving and/or approaching object 100. Because of this, a surface closed outward is produced, but all more or less sensitive components can be mounted on the back.

The operating device can also be formed as a type of keypad. For this purpose, the light guide 13 has several light-coupling devices 13a. The light-coupling devices 13a are preferably each spatially assigned to one transmitting element 11, so that the transmitting element 11 can be arranged in the form of a keypad. The corresponding light-coupling device 13a, which can preferably be formed arch-like or in the form of a circular segment, is situated on each of the several keys. For each key, a transmitting element 11 in the form of a light-emitting diode is preferably used. All transmitting elements 11 act through appropriate optics on the receiving element 12, which is simultaneously illuminated by an additional compensation LED 15. The light-coupling devices 13a can be produced, for example, by milling into the light guide 13. Since this milling or the light-coupling device 13a penetrates only partly into the light guide 13, light reflected in the rest of the light guide can go from each key position to the receiving element 12. The light-coupling device 13a preferably penetrates only about 50% into the light guide.

In principle, transmitting elements and receiving elements can also be reversed. For example, several receiving elements can be assigned to the keys, for example, one receiving element for each key, while at least two transmitting elements are preferably arranged on an appropriate location. In arranging the transmitting elements, it must only be ensured that a light path is possible up to the receiving element.

Figure 4:
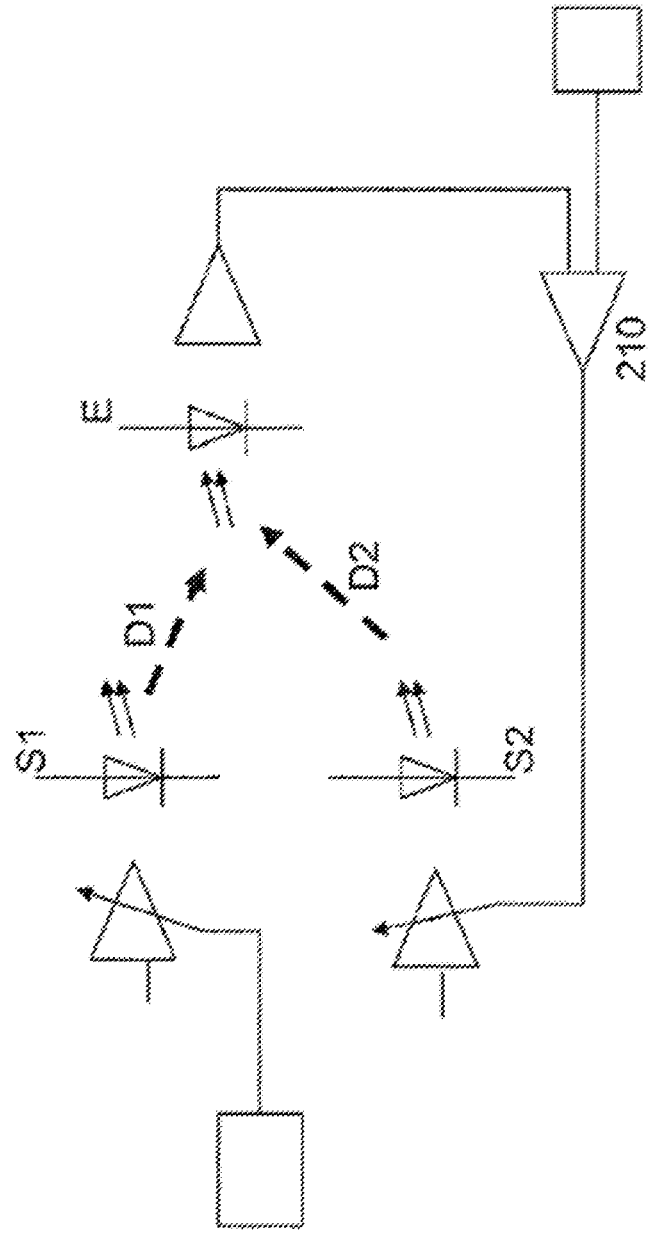
FIG. 4 shows a block diagram of a method for determining an optical signal independent of outside light and FIG. 5 shows another block diagram of a method for determining an optical signal independent of outside light.

In order to optically monitor the operating zone, the operating device can use special optical methods. In particular, environmental effects should not lead to an adverse effect of functioning of the operating device. Two first light sources S1, S2, here LEDs, send rectangularly modulated light in push-pull to receiver E in FIG. 4. The transmission amplitude is controllable. The receiver, with band pass characteristics, amplifies the received signal and feeds it to a regulator 10. This regulator, in a PI-design, now adjusts the amplitude of the controllable first light source S1, so that the alternating signal becomes zero on the receiver output. The regulator 210 for this purpose evaluates the received signal synchronously with the transmitter cycle, in order to detect the control direction. The regulator 210 breaks down into two parts: a detector of which transmitter is stronger and an integrator to generate the control quantity.

Another variant is based on the observation that for evaluation of which sensor transmits more strongly, it is sufficient to evaluate the received signal relative to phase position. An additional consideration of amplitude is not required, in principle. Based on this knowledge, digital embodiments can be quickly and favorably implemented, without incorrect signals occurring. There is both the possibility of introducing the control quantity so obtained as light via one of the transmitters or an additional light source as compensation light source back into the control path, but, as an alternative, also adding the signal so obtained as a current signal at the receiver. The second alternative does not consider all interferences that could occur based on the employed components, but, under some circumstances, this solution is sufficient, especially for more favorable variants, in which complete position or approach recognition does not matter.

To control the introduced light intensity, the received signal is no longer evaluated as in an analog evaluation with respect to amplitude, but instead the received signal is determined on receiver E with reference to phase position and a control quantity generated with it. This control quantity R can either be sent as a light signal through a corresponding current to at least one of the first light sources S1, S2, but it is also possible to feed everything through a current signal to the receiver by current addition. The additional light source that regulates the light intensity could be one of the first light sources S1, S2. As an alternative, however, it can also be an additional light source K connected to the receiver, in which control occurs through this additional light source K, so that it alternates its phase by driving this additional light source K via at least one ExOR-gate 21 or at least one ExNOR-gate.

Figure 5:
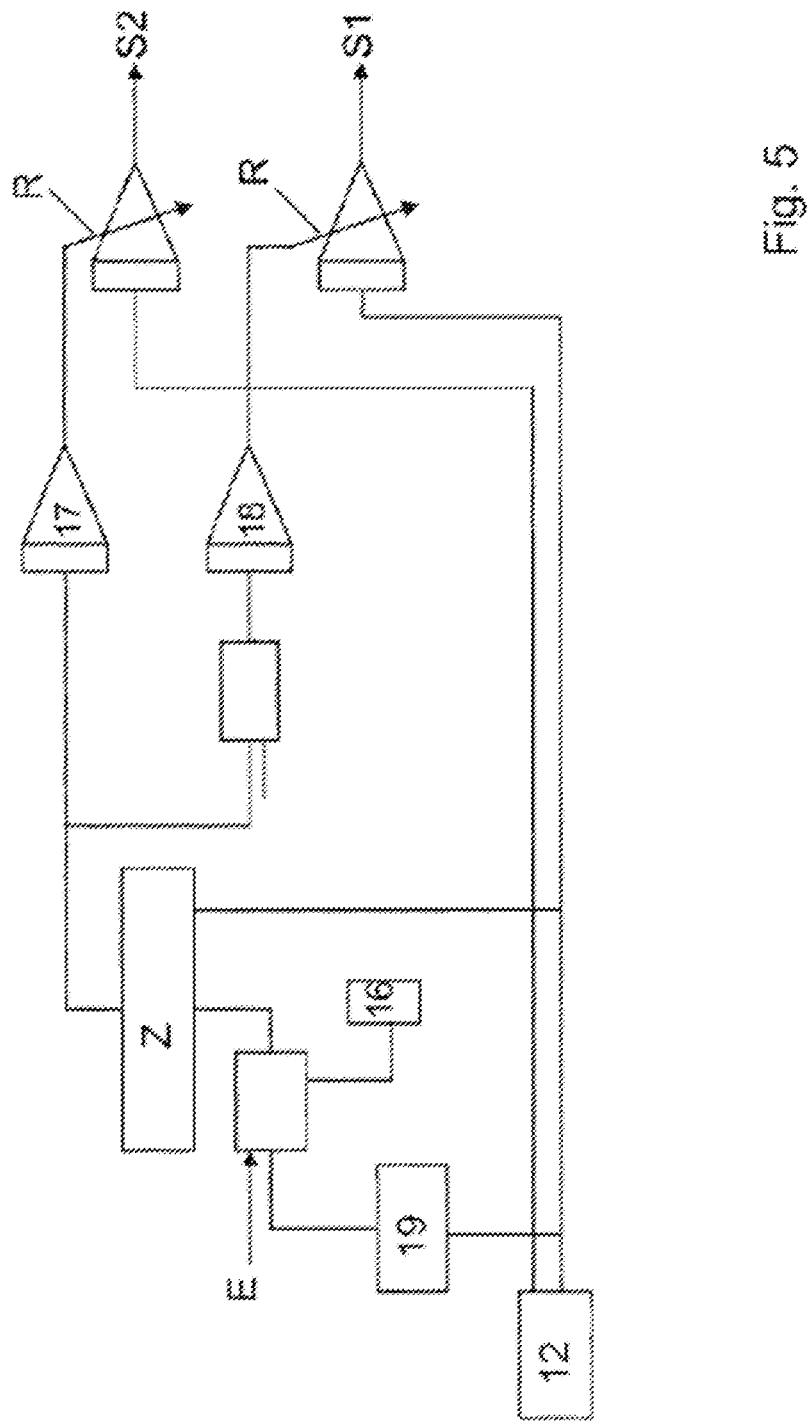

Implementation can occur according to FIG. 5, so that the digitized received signal is fed to the data line of a D-flip-flop 16. The clock for the flip-flop is derived from the transmitting time of the clock 12 (if necessary, delayed by means of a delay circuit 19), so that the clock signal is reproduced in the correct phase by transmitter S1 and inverted by transmitter S2. These stored values serve as control signal for the counting direction of counter Z. The counter state is converted by means of a DA-converter 17, 18 to the transmitting amplitude of, say, transmitter S2. As required, the transmission power of transmitter S1 is controlled with the inverted counter state or the inverted DA-converter result.

For detection of movement in the operating zone, two measurement zones between the transmitting element and receiving element can be incorporated. Whereas the transmitting element sends out radiation, the receiving element determines the back-radiation reflected on the object. The two measurement zones are driven in time sections via a clock generator. The clock signals are then fed via a multiplexer, in order to control additional transmitting elements, especially in a keypad. The detection signals determined by the receiving element are filtered and broken back down in a synchronous demodulator controlled by the clock generator to signals that can be assigned to the individual measurement zones. The useful signal determined by comparison in the measurement zones is fed to an evaluation unit, which switches the signal in the mobile identification transmitter as a function of it.

If uniform reflection occurs in both measurement zones, a useful signal of zero is produced. The useful signal is fed to a signal centering stage. Depending on whether a control voltage is applied to its output or not, the amount of radiation introduced to the measurement zones can then be regulated with this control voltage, so that back-control of the detection signal is produced as a function of a time constant. This occurs via the compensation LED, which is driven with the clock signal in counter phase, which is controlled on the regulator based on the useful signal. It is therefore possible to record dynamic changes, in which case reliable outside light compensation simultaneously occurs.

A light-emitting diode can be provided as compensation LED, which is controlled accordingly and, if required, kept in permanent operation and driven with a time-dependent radiation power as a function of the compensation required to compensate for the already timed transmitting element.

LIST OF REFERENCE NUMBERS

10 Handle device
11 Handle element
11 Transmitting element
12 Receiving element
13 Light guide
13a Light-coupling device
15 Compensation LED
19 Lock
20, 20' Electronic unit
21 Dialog
22 Signal
30 Movement pattern
31 Second movement pattern
40 Vehicle
42 Moving part
50 Operating device
60 Operating zone
70 Cover element
100 Object
110 Mobile indication transmitter

The invention claimed is:

1. A handle device for function initiation of a lock for opening and/or closing of a moving part, of a vehicle, the handle device comprising:
    an electronic unit and an operating device,
    wherein the electronic unit serves for data communication with a part of the vehicle,
    the operating device monitors an operating zone, and
    tripping of a signal occurs by means of the operating device through a movement of an object within the operating zone,
    wherein the operating device optically monitors the operating zone, wherein the operating zone is a three-dimensional zone, so that an at least two-dimensional movement recording in said three-dimensional zone of a stipulated movement pattern through movement object leads to tripping of the signal when the movement of the object corresponds to the stipulated movement pattern, and
    wherein the stipulated movement pattern is said at least two-dimensional movement of the object in the operating zone,
    wherein keyless activation of a locking and unlocking process of a lock can be initiated by means of the operating device,
    wherein keyless activation can be initiated in contactless fashion within the operating zone,
    wherein the operating device has a sensor, wherein the sensor is configured optoelectronically,
    wherein the operating device is arranged in a housing,
    wherein a cover element covers the operating device,
    wherein the cover element is transparent, and wherein the cover element is transparent for a wavelength emitted by at least one light transmitter,
    wherein the light transmitter is a light-emitting diode (LED), an organic light-emitting diode (OLED) or a laser diode.

2. The handle device according to claim 1, wherein the signal initiates opening and/or closing of the moving part, and wherein the signal initiates opening and/or closing of a door or a trunk lid of a vehicle.

3. The handle device according to claim 1, wherein depending on the stipulated movement pattern, the operating device serves as a push-button, a slider, a proximity detector, a motion detector and/or a detector that records three-dimensional movements.

4. The handle device according to claim 1, wherein the sensor has at least one light transmitter and at least one light receiver, in which the movement pattern of the object in the operating zone can be determined by means of the sensor.

5. The handle device according to claim 1,
wherein the object is a human hand, a human finger or a mechanical component.

6. The handle device according to claim 1,
wherein the cover element is bonded to the housing.

7. The handle device according to claim 6,
wherein the operating zone is arranged above an outside of the cover element facing the object.

8. The handle device according to claim 6,
wherein the operating device monitors a bottom of the cover element facing away from the object.

9. The handle device according to claim 8,
wherein an outside of the cover element has a surface structure.

10. The handle device according to claim 1,
wherein the operating zone is arranged above an outer surface of the housing facing object, and wherein the operating zone has a drop-like shape.

11. The handle device according to claim 4,
wherein at least one light transmitter emits infrared light.

12. The handle device according to claim 4,
wherein at least one light transmitter contains at least one optoelectronic measurement device with at least five light transmitters and at least one light receiver.

13. The handle device according to claim 4,
wherein the sensor contains at least one optoelectronic measurement device with at least two light transmitters and at least one light receiver, in which recording lobes define a far zone lying within the operating zone and a near zone, the recording lobes being assigned to the light transmitters, and that the operating device also has an evaluation unit, in which the evaluation unit trips the signal, starting from a movement of the object from a position in the far zone in a predetermined direction into the near zone.

14. The handle device according to claim 4,
wherein the sensor is a HALIOS® component.

15. The handle device according to claim 1,
wherein the operating device has at least one transmitting element for radiation in the wavelength range of light and at least one receiving element to receive at least part of the radiation emitted by the transmitting element and back-radiated from the object, and with a light guide arranged in the beam path between the transmitting element and receiving element, in which the light guide itself has light-coupling devices to couple radiation diffusely scattered on the object and introduced beforehand through light guide.

16. The handle device according to claim 15,
wherein the light-coupling devices couple the light scattered by the object across the longitudinal extent of light guide into the light guide.

17. The handle device according to claim 1,
wherein the operating device has an arrangement for measurement or recognition of a change on or as a result of a back-radiating element, in which the arrangement for measurement or recognition of a change on or as a result of a back-radiating element, which is separated from the arrangement by a medium transparent for a certain radiation, has
a sensor-active region in the medium with at least two measurement zones with coordinated radiation sources for introduction of the specified radiation into the radiation-transparent medium and with at least one radiation receiver, in which the radiation receiver is arranged in the overlapping region of the zones of maximum radiation intensity in the sensor-active region situated in a state of rest of the back-radiation emerging from the side of the medium opposite the back-radiating element of radiation sources assigned to the radiation receiver in order to generate a detection signal corresponding to the received radiation,
a switch arrangement for timed activation of each of the individual measurement zones in a consecutive, repeating switching sequence with a certain switching sequence frequency,
an adjustment arrangement to adjust a measured radiation power of the radiation source assigned to the corresponding measurement zone, so that in the sensor-active region situated in a state of rest, each measurement zone produces a section of the detection signal, whose average amplitude value is equal to the average amplitude value of the section of the detector signal assigned to at least one other measurement zone,
a filter circuit connected after the radiation receiver to transmit the detection signal modulated on an oscillation of the switching sequence frequency to an evaluation arrangement to generate a control and/or a measured value signal from the difference measured in the evaluation arrangement or determined in it of the sections of the detection signal assigned to individual measurement zones.

18. The handle device according to claim 17,
wherein at least two measurement zones are formed by at least one light transmitter and several light receivers.

19. A vehicle, with the handle device according to claim 1.

20. A method for contactless tripping of a signal on a handle device, in which
the handle device serves for function initiation of a lock for opening and/or closing of a moving part of a vehicle, the method comprising:
providing in the handle device an electronic unit and an operating device,
the electronic unit serving for data communication with a part on the vehicle side,
monitoring an operating zone via the operating device, and
tripping a signal via the operating device by movement of an object within the operating zone,
wherein the operating zone is optically monitored by the operating device, wherein the operating zone is a three-dimensional zone, and by an at least two-dimensional recording in said three-dimensional zone of a stipulated movement pattern, the signal is tripped by movement of object when the movement of the object corresponds to the stipulated movement pattern, and
wherein the stipulated movement pattern is said at least two-dimensional movement of the object in the operating zone,
wherein keyless activation of a locking and unlocking process of a lock can be initiated by means of the operating device,
wherein keyless activation can be initiated in contactless fashion within the operating zone
wherein the operating device has a sensor, wherein the sensor is configured optoelectronically,
wherein the operating device is arranged in a housing,
wherein a cover element covers the operating device,
wherein the cover element is transparent, and wherein the cover element is transparent for a wavelength emitted by at least one light transmitter,
wherein the light transmitter is a light-emitting diode (LED), an organic light-emitting diode (OLED) or a laser diode.

21. The method according to claim 20,
wherein the movement pattern includes said at least two-dimensional movement of the object in the operating zone, and wherein the movement pattern includes at least three-dimensional movement of the object from the operating zone.

22. The method according to claim 20,
wherein a second movement pattern initiates a second signal, in which the movement pattern and the second movement pattern are different.

23. The method according to claim 22,
wherein the object is moved in the movement pattern in a first direction through operating zone and in the second operating pattern, the object is moved in the second direction through the operating zone, and wherein the first direction and the second direction are opposite.

24. The method according to claim 20,
wherein by execution of the movement pattern, keyless activation of a locking and unlocking process of a lock is initiated.

25. The method according to claim 20,
wherein for activation of the locking process, the object is moved according to the movement pattern in a first direction through operating zone.

26. The method according to claim 22,
wherein for operation of the unlocking process, the object is moved according to the second movement pattern in the second direction through the operating zone.

27. The method according to claim 20,
wherein for operation of the unlocking process, a linear movement pattern is executed, and wherein a user swipes over the operating zone to activate the unlocking process.

28. The method according to claim 20,
wherein the movement pattern of a locking or unlocking process of the lock is displayed on a display.

29. The method according to claim 20,
wherein an authorization query for activation of the unlocking and/or locking process is carried out, and wherein the authorization query is carried out after tripping of the signal, with particular preference that a mobile identification transmitter carries out a dialog with the electronic unit after tripping of the signal, with particular preference that authorization is checked within the context of dialog.

30. The method according to claim 29,
wherein during a positive result of the authorization query, activation of the unlocking and/or locking process is carried out.

31. The method according to claim 20,
wherein the sensor has at least two first light sources, which emit light in phases sequentially timed, and at least one receiver to receive at least the alternating light fraction originating from the first light sources synchronized in time.

32. The method according to claim 31,
wherein the sensor controls a light intensity emitted through at least one light source, so that a time-synchronized alternating light fraction that occurs between different phases becomes zero on the at least one receiver and a received signal is determined on the at least one receiver with reference to phase position to control the emitted light intensity and a control quantity generated with the received signal.

33. The method according to claim 20,
wherein recognition of a movement pattern with the handle device includes:
    emission of radiation in the wavelength range of the light,
    passage of the light through a light guide to the object,
    back-radiation of at least part of the light from the object and back-coupling of the back-radiated light into light guide,
    receiving of the back-radiated light to form an input signal,
    evaluation of the input signal to determine the movement and/or position of object, and
    the a diffusely back-scattered light via light-coupling devices of the light guide itselfis coupled into the light guide.

34. The method according to claim 33,
wherein the light-coupling devices couple the light back-scattered from object into the light guide across the longitudinal extent of the light guide.

35. The method according to claim 33,
wherein the radiation emitted by the transmitting element through the light guide, starting from the side opposite object, is sent transversely through light guide before it is back-scattered by object.

36. The method according to claim 33,
wherein the radiation emitted from the transmitting element along light guide is decoupled by the light-coupling devices at least partially from the light guide before it is scattered by object.

37. A handle device that is operational in accordance with the method of claim 20.

* * * * *